(12) United States Patent
Thienel et al.

(10) Patent No.: US 11,712,991 B2
(45) Date of Patent: Aug. 1, 2023

(54) CARRIER WITH A FASTENING AREA MADE OF A FIBER COMPOSITE MATERIAL AND WITH AT LEAST ONE SUPPORT ELEMENT LOCKING A FASTENING ELEMENT

(71) Applicant: Brose Fahrzeugteile SE & Co. Kommanditgesellschaft, Bamberg, Bamberg (DE)

(72) Inventors: Michael Thienel, Thurnau (DE); André Carl, Coburg (DE); Dominik Hofmann, Baunach (DE); Sebastian Merkle, Burgpreppach (DE)

(73) Assignee: Brose Fahrzeugteile SE & Co. Kommanditgesellschaft, Bamberg

( * ) Notice: Subject to any disclaimer, the term of this patent is extended or adjusted under 35 U.S.C. 154(b) by 471 days.

(21) Appl. No.: 16/819,391

(22) Filed: Mar. 16, 2020

(65) Prior Publication Data
US 2020/0298742 A1    Sep. 24, 2020

(30) Foreign Application Priority Data
Mar. 21, 2019   (DE) .................... 10 2019 203 906.5

(51) Int. Cl.
*B60P 1/64* (2006.01)
*B60P 7/08* (2006.01)
*F16B 29/00* (2006.01)
*B60J 5/04* (2006.01)
*B62D 65/06* (2006.01)

(52) U.S. Cl.
CPC ............. *B60P 1/649* (2013.01); *B60J 5/0468* (2013.01); *B60P 7/0815* (2013.01); *B62D 65/06* (2013.01); *F16B 29/00* (2013.01)

(58) Field of Classification Search
CPC ........ B60J 5/0416; B60J 5/0468; B60J 5/048; B60P 1/649; B60P 1/70815; B62D 65/06; F16B 5/02; F16B 29/00; B29C 70/74; B29C 65/56; B29L 2031/3052
See application file for complete search history.

(56) References Cited

U.S. PATENT DOCUMENTS

| 8,172,305 B2 | 5/2012 | Schmelz et al. |
| 2006/0283091 A1 | 12/2006 | Papi et al. |
| 2018/0370096 A1* | 12/2018 | Fuchs ..................... B32B 27/36 |

FOREIGN PATENT DOCUMENTS

| CN | 102933411 A | 2/2013 |
| CN | 103649564 A | 3/2014 |
| CN | 105392605 A | 3/2016 |
| CN | 106182757 A | 12/2016 |

(Continued)

*Primary Examiner* — Lori L Lyjak
(74) *Attorney, Agent, or Firm* — Dickinson Wright PLLC

(57) ABSTRACT

A carrier assembly for a vehicle, comprising a carrier component. A fastening point for fastening the carrier component is provided at a fastening area of the carrier component made of a fiber composite material, which specifies a position for a through-opening yet to be formed by the attachment of a fastening element along a direction of attachment and which forms at least one support element protruding along the direction of attachment, against which a head portion of the fastening element rests at least in a non-positive manner when a fastening portion of the fastening element properly extends through the material of the carrier component.

19 Claims, 3 Drawing Sheets

(56) References Cited

FOREIGN PATENT DOCUMENTS

| | | | | |
|---|---|---|---|---|
| CN | 107405843 | A | 11/2017 | |
| CN | 108602417 | A | 9/2018 | |
| CN | 109070943 | A | 12/2018 | |
| DE | 102012023588 | A1 | 7/2013 | |
| DE | 102013213711 | A1 | 1/2015 | |
| DE | 102017208274 | A1 | 11/2018 | |
| EP | 2962880 | A1 * | 1/2016 | ............ B60J 5/0431 |
| KR | 20110055485 | A * | 5/2011 | |
| WO | WO-2013106907 | A1 * | 7/2013 | ............ B60J 5/0468 |
| WO | WO-2013172091 | A1 * | 11/2013 | ............. B29C 45/34 |
| WO | 2016177734 | A1 | 11/2016 | |

* cited by examiner

CARRIER WITH A FASTENING AREA MADE OF A FIBER COMPOSITE MATERIAL AND WITH AT LEAST ONE SUPPORT ELEMENT LOCKING A FASTENING ELEMENT

CROSS-REFERENCE TO RELATED APPLICATIONS

This application claims priority to German Patent Application No. DE 10 2019 203 906.5, filed on Mar. 21, 2019, the disclosure of which is hereby incorporated in its entirety by reference herein.

TECHNICAL FIELD

The present disclosure relates to a carrier assembly for a vehicle and a method of assembling same.

BACKGROUND

Vehicles may include one or more mechanisms that move a window pane. As an example, a vehicle may include a carrier assembly that may include a carrier component that may receive functional components that may be fastened to the carrier component. The carrier component may be fastened to a vehicle component, e.g. an inner panel of a vehicle door, via at least one fastening point.

SUMMARY

According to one embodiment, a carrier assembly is provided. The carrier assembly may include a fastening point to receive a fastening element in a fastening area of a carrier component made of a fiber composite material. The fastening area specifies a position for the through opening to be formed (yet) by attaching the fastening element along a direction of attachment and forms at least one support element protruding along the direction of attachment, against which support element a head portion of the fastening element rests at least in a non-positive manner when the fastening portion (extending away from the head portion along the direction of attachment) of the fastening element properly extends through the material of the carrier component.

Because the fiber content may have a low density, fiber composite materials may creep only to a small extent, so that in the region of the fastening point, little or no significant setting behavior and a resulting decrease of clamping forces will occur. Since the fiber composite material is not provided with a through opening at the fastening point, but is rather pre-punched, a backlash-free connection may be provided. A support element for a non-positive abutment of a head portion of the fastening element, which is different from the fastening portion, may fix the fastening element and may ensure transmission of loads occurring at the fastening point beyond the support element. As compared to previously employed carrier assemblies, this may provide for transmission of comparatively high forces in the region of a fastening point. The support element protruding along the direction of attachment may laterally support the head portion to create a non-positive abutment of the head portion when the fastening portion of the fastening element for fastening the carrier component to the vehicle component is guided through the material of the carrier component.

For example, the fastening area with the fastening point is formed by an organo-sheet. In addition to the fastening area, a large part of the carrier component such as a carrier surface defined by the carrier component may be formed to receive functional components made of organo-sheet. By a large part it here is meant that the carrier component for a major part is formed by organo-sheet and hence the organo-sheet forms just that part of the carrier component which experiences most of the forces occurring under normal operating conditions. A part of the carrier component made of organo-sheet (for example a coherent part carrying one or more guide rails) or several parts of the carrier component made of organo-sheet (for example parts carrying one or more guide rails) thus for example extend over about 30% or more of a surface of the carrier component. In one or more embodiments, the organo-sheet may extend over more than 30%, such as over more than 40% and in general over at least 50% of a carrier surface of the carrier component so that the organo-sheet hence also forms a corresponding part of more than 30%, in particular more than 40% or about 50% or more of the surface of the carrier component in a main plane defined by the carrier component.

A main component, in addition to the fastening area of the carrier component for example, may be a plate-shaped semi-finished product that may be made of an organo-sheet. Thus, the organo-sheet may define a substantially planar portion of the carrier component, but may also be supplemented by further components and materials. For example, metallic elements and/or plastic elements may be incorporated into the organo-sheet or be attached to the organo-sheet, and may be injected-molded thereto.

In one or more embodiments, the support element may formed by a portion of at least one rib integrally molded to the carrier component. Such a rib, for example, may be formed by the fiber composite material that may also be provided for the formation of the fastening area itself. Alternatively, this may be another material, but in particular likewise a fiber composite material. In the latter case, the rib then for example is injection-molded to the fastening area and here in particular to an organo-sheet forming the fastening area. For example, the rib is formed by long-fiber-reinforced polypropylene (PP-LGF).

To support a secure non-positive abutment and to provide an additional positive connection of the head portion of the fastening element at the support element, the support element may define a concavely curved inner wall against which the head portion rests in a non-positive manner. This concavely curved inner wall for example may be shaped as a circular arc. The concavely curved inner wall thus extends along a circular arc, and this contour of the inner wall may correspond to a contour of an abutting head portion, so that when the carrier component is fixed to the vehicle component, a line contact or possibly even a face-to-face contact may be formed at the concavely curved inner wall between the support element and the head portion. In this way, loads at the fastening point may be effectively absorbed by the support element.

For example, the support element may define a receptacle having a circular cross-section for receiving the head portion of the fastening element. The head portion of the fastening element may form an area that may have circular cross-section, that may be positively accommodated in the circular receptacle of the support element. The circular cross-section of the head portion may clamp to the circular receptacle of the support element, so that a force fit condition may be provided at the support element. Thus, the head portion of the fastening element may be of circular disk-shaped design. The support element in turn may be formed to have a circumferential annular rib that may surround the circular receptacle for the head portion of the fastening element.

For the additional tolerance compensation, at least one scraping rib may be formed on the support element for a connection with the head portion of the fastening element. In this way, a force fit between the head portion and the support element, in particular a press fit, may be supported, and backlash-free fixation may be provided by the abutment of the head portion against the support element.

In one or more embodiments, the head portion may be conically tapered in the direction of attachment to achieve a corresponding support of the non-positive abutment of the head portion against the support element. The head portion of the fastening element may broaden along a direction of extension opposite to the direction of attachment. On attachment along the direction of attachment, the corresponding broadening of the head portion may lead to the fact that with a shell surface area of ramp-shaped extension in a longitudinal section the head portion is pressed against the support element when the fastening element is fixed to the vehicle component with its fastening portion and thereby is displaced relative to the carrier component along the direction of attachment.

The fastening element may be a screw, a bolt, or a rivet.

In yet another embodiment, the carrier component may extend in planar direction and may define a carrier surface that may extend along a main plane, to which a plurality of functional components, for example of a vehicle window lifter, may be fastened or pre-mounted.

The carrier component may carry functional elements of a window lifter that may adjust a window pane of the vehicle. As an example, the carrier component may be equipped and provided for the wet/dry space separation on a vehicle door.

According to another embodiment, a method for the assembly of a carrier component provided for fastening functional components to a vehicle part, is provided. The method may include guiding a fastening portion of a fastening element along a direction of attachment through a material of the carrier component in a fastening area of the carrier component made of a fiber composite material in order to fix the fastening portion to the vehicle component and thereby fasten the carrier component to the vehicle component. A through opening for the fastening portion through the carrier component here is not prefabricated, but will only be formed by the attachment of the fastening element. A screw, a bolt or a rivet as a fastening element may cut or drill the through opening during assembly in order to achieve a rather backlash-free connection between the fastening element and the fastening area or the fiber composite material of the fastening area.

As an example, a pre-drilled or pre-punched hole (not completely penetrating the material of the carrier component) may be provided within the fastening area in order to specify the position at which a fastening portion of the fastening element may be guided through the carrier component during the assembly.

The fastening area of the carrier component may include a support element protruding along the direction of attachment of the fastening element. A head portion of the fastening element at least non-positively rests against this support element when the fastening portion of the fastening element has been guided through the material of the carrier component. The at least non-positive abutment of the head portion of the fastening element against the support element in particular may be provided only when the fastening portion of the fastening element has been properly (for example completely) guided through the material of the carrier component and has been inserted or turned into the vehicle component in order to thereby fasten the carrier component to the vehicle component.

A design variant of a proposed assembly method may make use of a design variant of a proposed carrier assembly. The advantages and features of design variants of a proposed carrier assembly as explained above and below thus also apply for design variants of a proposed assembly method, and vice versa.

BRIEF DESCRIPTION OF THE DRAWINGS

The attached Figures by way of example illustrate possible design variants of the proposed solution. In the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It already is widely known from practice that carrier components, in particular for vehicle doors, are made of a plastic material. To reliably and durably transmit fastening and operating forces, sheet-metal bushings frequently are provided to define the fastening points. These sheet-metal bushings are used to avoid a creeping and setting behavior that generally occurs with plastic screw connections. Screw or rivet connections that directly clamp the plastic material to a joining partner in the form of the vehicle component generally will not create a lasting connection due to the creeping and setting behavior, as the tightening torque is reduced over time. The connection hence is losing strength.

Against this background, there is a need for an improved carrier assembly and an improved method for mounting a carrier assembly, such as a carrier component to a vehicle component.

Figure 5:
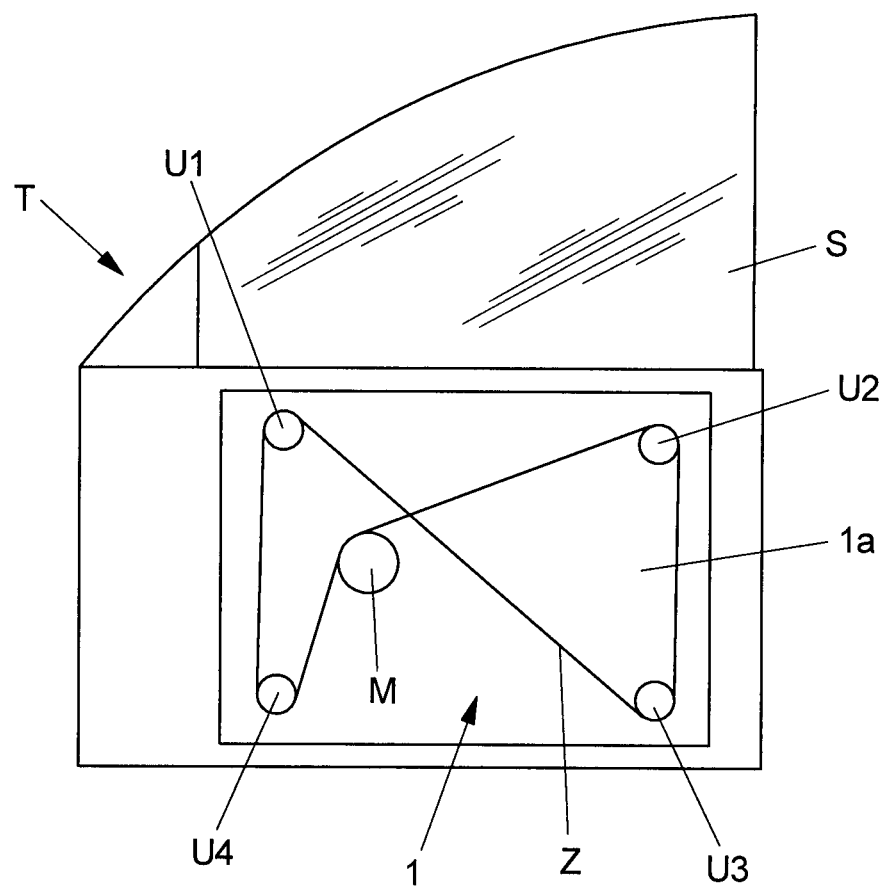
FIG. 5 schematically and in a side view shows a vehicle door with a carrier component which may be configured corresponding to FIGS. 1 to 4.

FIG. 5 schematically and in a side view shows a vehicle door T with an adjustable window pane S. For an adjustment of the window pane S a window lifter is accommodated in a cavity of the vehicle door T. This window lifter includes a motor drive for adjusting a Bowden cable Z which is guided over a plurality of deflection elements U1 to U4, e.g. rigid deflection pieces or a rotatable cable pulley, in order to be able to lift or lower the window pane S when a cable drum is rotated by the drive M. Components of the window lifter, in particular the drive M and/or the deflection elements U1 to U4 and possibly a guide guiding the window pane S and/or a guide rail guiding a carrier coupled with the Bowden cable Z and connected to the window pane S are fastened to a carrier surface 1a of a carrier component 1. The carrier component 1 is extended in a planar manner and may serve the wet/dry space separation in the vehicle door T in a manner known per se.

In the present case, the carrier component 1 extended in a planar manner for the most part or even almost completely is formed from a fiber composite material, here an organo-sheet. In particular, fastening points of the carrier component 1 for fastening the carrier component 1 to a vehicle component of the vehicle door T, for example to a door inner skin, such as a door inner panel, are formed from the fiber composite material.

Figure 2:
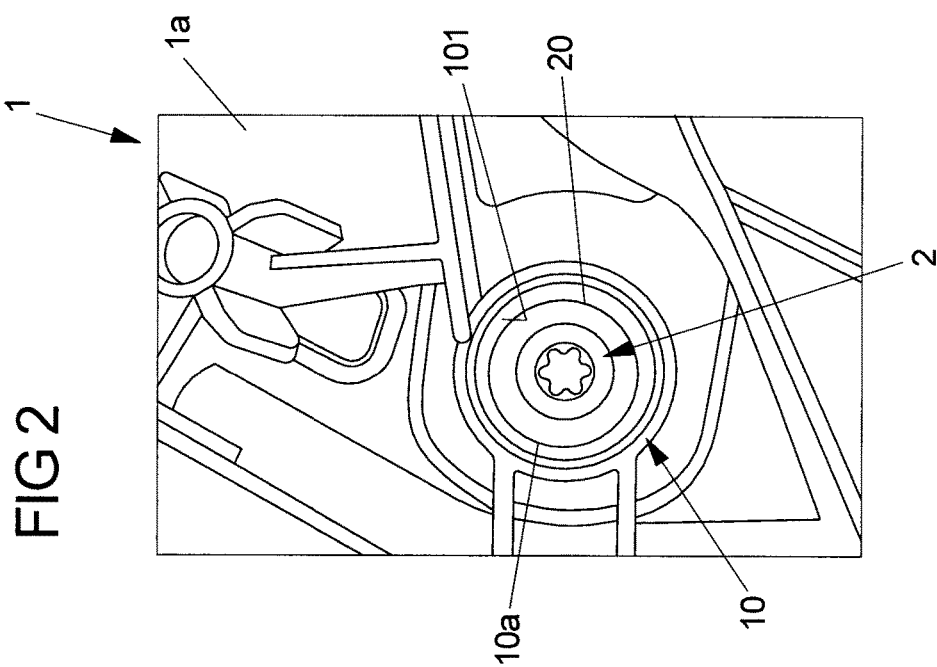
FIG. 2 likewise in a perspective view and sectionally shows the carrier component of FIG. 1 looking at a further fastening point with a receptacle for a fastening element formed by an annular rib (cf. also FIG. 1)
Figure 1:
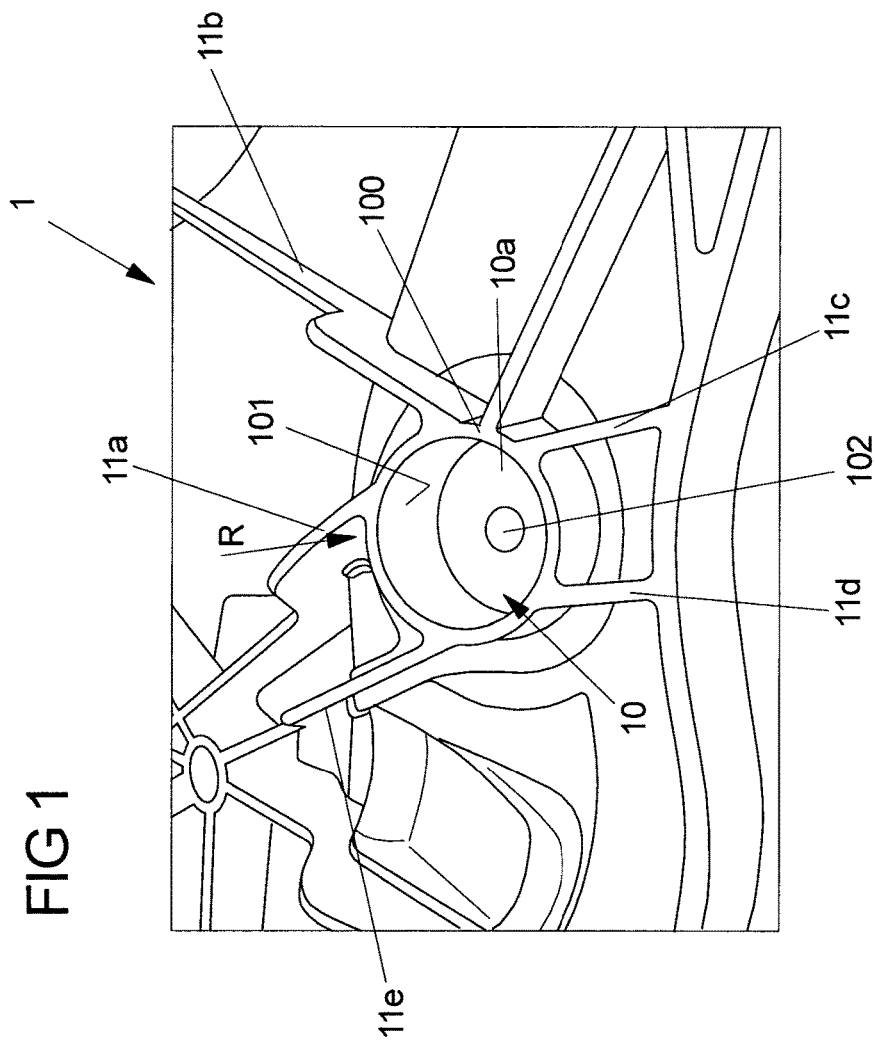
FIG. 1 sectionally shows a design variant of a proposed carrier assembly in a perspective view looking at a fastening area with a support element configured as an annular rib on a carrier component which defines a receptacle for a head portion of a fastening element.
Figure 4:
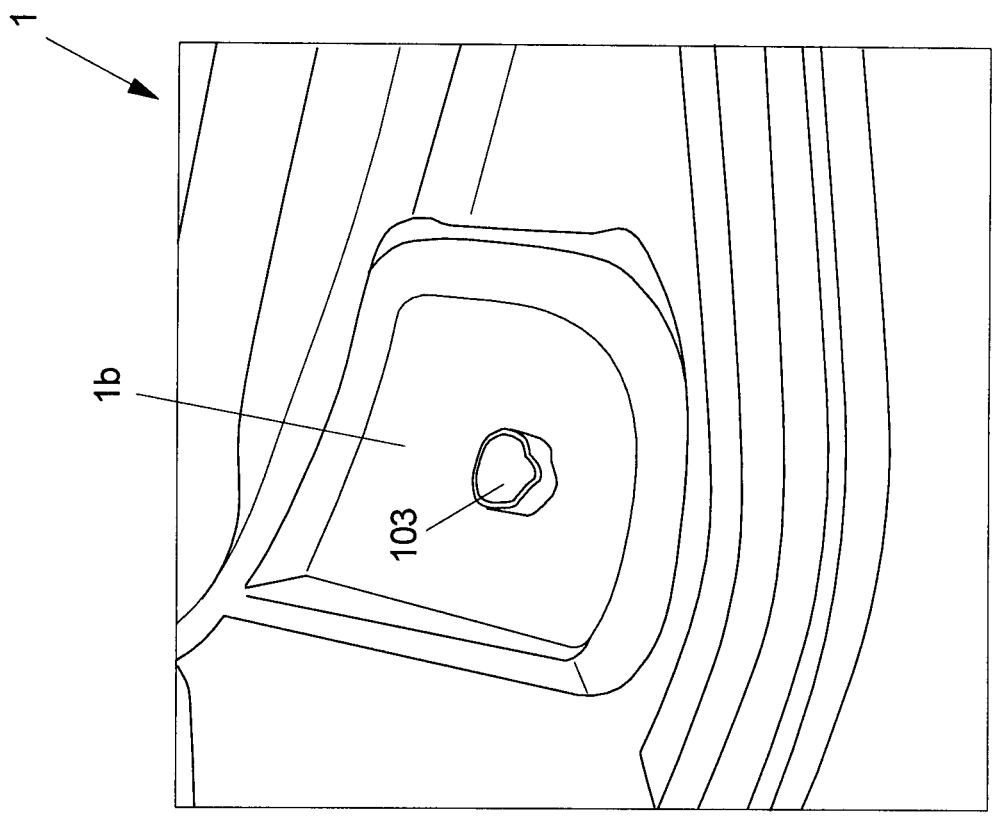
FIGS. 3-4 sectionally show the carrier component of FIGS. 1 and 2 looking at a rear side with a screw screwed in as a fastening element (FIG. 3) as well as after unscrewing the screw (FIG. 4)

Looking at the carrier surface 1a, FIGS. 1 and 2 sectionally show two fastening points 10 which each are provided on a fastening area of the carrier component 1 made of organo-sheet. For fastening the carrier component 1 to the vehicle component of the vehicle door T, for example a self-tapping screw, a self-tapping bolt or a rivet is used. In other words, no through opening each is prefabricated at the fastening point 10, through which a portion of the respective fastening element must extend in order to be able to get into engagement with the vehicle component. For example a thread portion of a screw 2 as fastening element is configured to be self-tapping so that a through opening at the fastening point 10 only is obtained when screwing in the screw 2 during the assembly. Due to the high fiber content and the low density of the organo-sheet used here, hardly any creeping and no significant setting behavior will occur after the assembly. A decrease of the clamping forces at the fastening point 10 hence is reduced considerably and even may be excluded completely.

To additionally increase the transmissibility of the forces occurring at the fastening point 10, a support element in the form of an annular rib 100 each is formed at the fastening area 10 of FIGS. 1 and 2. This annular rib 100 protrudes substantially perpendicularly from the carrier surface 1a and hence along a direction of attachment R, along which the respective fastening element, corresponding to FIGS. 2 and 3 for example a screw S, is attached to the carrier component 1.

The annular rib 100 surrounds a receptacle 10a. A circumferential, concavely curved inner wall 101 of the annular rib 100 thus completely encloses the receptacle 10a. The receptacle 10a is dimensioned and matched with a head part in the form of a screw head 20 of the screw 2 used for fixation such that the screw head 20 is positively accommodated in the receptacle 10 and, by clamping, rests against the inner wall 101 when the screw 2 has properly been screwed in for fastening the carrier component 1. In the properly mounted condition, a circular disk-shaped screw head 20 of the screw 2 thus is present in the receptacle 10 fully surrounded and thus may bear against the annular rib 100.

Relative to a longitudinal axis of the screw and the direction of attachment R, additional reinforcing ribs 11a to 11e are integrally molded to the annular rib 100 for radial support. The reinforcing ribs 11a to 11b as well as the annular rib 100 may be injection-molded to the organo-sheet of the fastening area of the carrier component 1 forming the fastening point 10. For the annular rib 100 as well as the reinforcing ribs 11a to 11e another or an identical fiber composite material may be used. For example, the annular rib 100 is injection-molded to the organo-sheet of the carrier component 1 as a support element made of PP-LGF.

To specify the exact position for screwing in the screw 2 at the fastening point 10 also without forming a through opening, a depression 102 centrally is molded into the receptacle 10a as a positioning aid. This depression 102 acts as a pre-punched hole not penetrating the material of the carrier component, to which the tip of the screw 2 may be applied in order to screw the same through the material of the carrier component 1 at the depression 102 with its thread portion 21 (as a fastening portion of the fastening element in the form of the screw 2) and to screw the same into a vehicle component in order to fix the carrier component 1 thereto.

Figure 3:
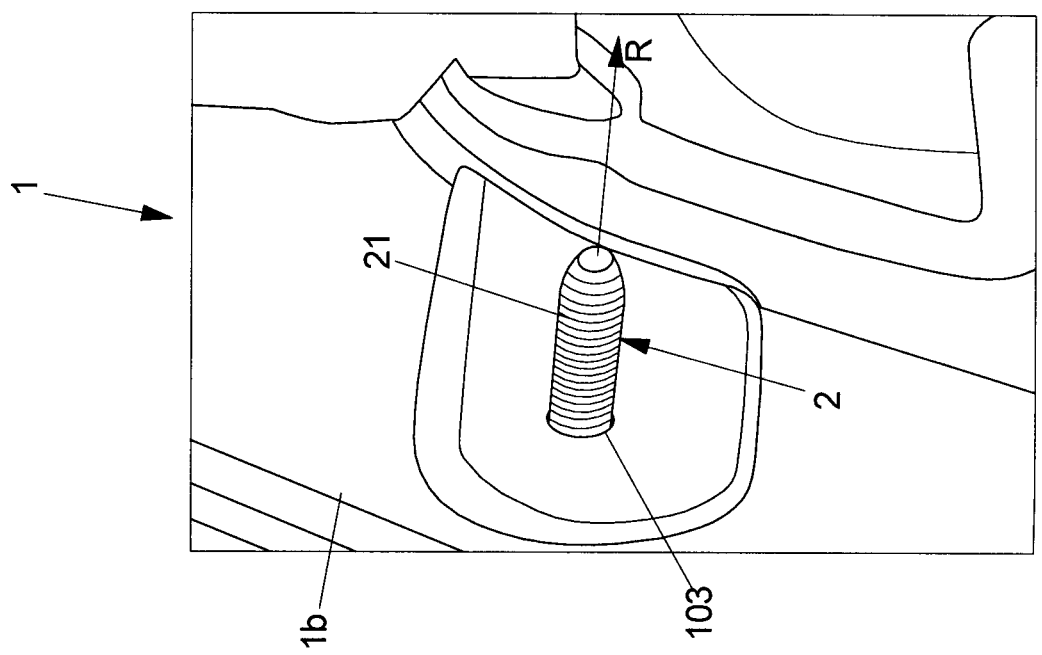

When the thread portion 21 corresponding to FIG. 3 maximally protrudes on a rear side 1b of the carrier component 1, the disk-shaped screw head 20 is present on the carrier surface 1a in a form positively and non-positively accommodated in the receptacle 10a. A through-opening 103 obtained by screwing in the screw 2, via which the thread portion 21 extends through the carrier component 1, then accommodates the screw 2 free from backlash and ensures a permanent fixation of the carrier component 1 at the fastening point 10 without any decrease of the clamping forces.

1 carrier component
10 fastening point
100 annular rib (support element)
101 inner wall
102 depression
103 through-opening
10a receptacle
11a-11e reinforcing rib
1a carrier surface
1b rear side
2 screw (fastening element)
20 screw head (head part)
21 thread portion (fastening portion)
M drive
R direction of attachment
S window pane
T vehicle door
U1-U4 deflection element
Z Bowden cable While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A carrier assembly for use in a vehicle including a vehicle component, the carrier assembly comprising:
　a carrier component configured to carry a number of functional components and including a fastening area, wherein the fastening area is formed of a fiber composite material, wherein the fastening area includes a predefined portion; and
　a fastening element, including a head portion, configured to extend along a direction of attachment through the pre-defined portion to form a through hole through the pre-defined portion, wherein the fastening element includes a fastening portion configured to engage the vehicle component, wherein the fastening area includes at least one support element protruding along the direction of attachment, and wherein the head portion abuts against in a force-locking manner and is supported by the support element when the fastening portion engages the vehicle component so that forces applied to the fastening area are transmitted by the head portion of the fastening element to the support element protruding from the fastening area.

2. The carrier assembly of claim 1, wherein the fiber composite material is formed by an organo-sheet.

3. The carrier assembly of claim 1, wherein the support element is formed by a portion of a rib integrally molded to the carrier component.

4. The carrier assembly of claim 3, wherein the rib is formed by the fiber composite material.

5. The carrier assembly of claim 3, wherein the rib is injection-molded to the fastening area.

6. The carrier assembly of claim 5, wherein the rib is formed by a fiber composite material injection-molded to the fastening area.

7. The carrier assembly of claim 1, wherein the support element defines a concavely curved inner wall, wherein the head portion lies along the concavely curved inner wall in a non-positive manner.

8. The carrier assembly of claim 7, wherein the concavely curved inner wall extends along a circular arc.

9. The carrier assembly claim 1, wherein the support element defines a receptacle having a circular cross-section configured to receive the head portion of the fastening element.

10. The carrier assembly of claim 1, wherein the head portion is conically tapered along the direction of attachment.

11. The carrier assembly of claim 1, wherein the fastening element is a screw, a bolt, or a rivet.

12. The carrier assembly of claim 1, wherein the carrier component extends in a planar manner and/or wherein the functional components are configured to adjust a position of a window pane.

13. A method for mounting a carrier component, configured to carry a number functional components, to a vehicle component, the method comprising:
providing the carrier component defining a fastening area formed of a fiber composite material;
guiding a fastening portion of a fastening element through a predefined portion of the fastening area along a direction of attachment to form a through-hole through the carrier component; and
fastening the fastening portion to the vehicle component so that a head portion of the fastening element abuts in a force-locking manner against and is supported by a support element of the fastening area protruding along the direction of attachment so that loads applied to the fastening area are transmitted from the fastening element to the support element, when the fastening element engages the vehicle component.

14. The method of claim 13, wherein the guiding step includes cutting through the predefined portion by rotating the fastening portion, provided with a number of self-tapping threads, through the predefined portion.

15. The carrier assembly of claim 1, wherein the predefined portion is formed by a depression defined by the fastening area.

16. The carrier assembly of claim 1, wherein the support element defines a receptacle configured to receive the head portion of the fastening element.

17. The carrier assembly of claim 16, wherein the support element circumferentially surrounds the fastening area.

18. The carrier assembly of claim 1, wherein the support element includes an annular rib forming a receptacle configured to receive the fastening element.

19. The carrier assembly of claim 18, further comprising a number of reinforcement ribs radially extending from the annular rib.

* * * * *